US012123498B2

(12) United States Patent
Baracca et al.

(10) Patent No.: US 12,123,498 B2
(45) Date of Patent: Oct. 22, 2024

(54) SEALING DEVICE FOR WASHING MACHINE SLEEVES

(71) Applicant: AKTIEBOLAGET SKF, Gothenburg (SE)

(72) Inventors: Fausto Baracca, Massa (IT); Fabio Cavacece, Rome (IT); Pasquale Frezza, Aversa (IT); Andrea A. Bertolini, Carrara (IT)

(73) Assignee: AKTIEBOLAGET SKF (SE)

( * ) Notice: Subject to any disclaimer, the term of this patent is extended or adjusted under 35 U.S.C. 154(b) by 49 days.

(21) Appl. No.: 17/988,973

(22) Filed: Nov. 17, 2022

(65) Prior Publication Data

US 2023/0160472 A1    May 25, 2023

(30) Foreign Application Priority Data

Nov. 24, 2021    (IT) .......................... 102021000029621

(51) Int. Cl.
*F16J 15/3204*        (2016.01)
(52) U.S. Cl.
CPC ................................. *F16J 15/3204* (2013.01)
(58) Field of Classification Search
CPC .... F16J 15/00; F16J 15/16; F16J 15/50; F16J 15/52; F16J 15/32; F16J 15/3204; F16J 15/3208; F16J 15/312
USPC ........................................................ 277/549
See application file for complete search history.

(56) References Cited

U.S. PATENT DOCUMENTS 9,358,833 B2 *   6/2016  Gulli .................... F16J 15/3264
10,119,571 B2 *  11/2018  Seno ....................... F16C 33/80
2004/0026867 A1 *  2/2004  Adams ................ F16C 33/7813
                                                            277/349
2015/0098670 A1 *  4/2015  Gulli ....................... F16C 33/76
                                                            384/486
2019/0010989 A1 *  1/2019  Falaschi .............. F16C 33/7863
2021/0254668 A1    8/2021  Suzuki

FOREIGN PATENT DOCUMENTS

DE             228015    10/1985
DE       102008017409    10/2009

OTHER PUBLICATIONS

Search Report for corresponding Italy Patent Application No. 102021000029621 dated Jul. 4, 2022.

* cited by examiner

*Primary Examiner* — Nathan Cumar
(74) *Attorney, Agent, or Firm* — Reed Smith LLP

(57) ABSTRACT

A sealing device for a sleeve of washing machines, comprising a first, stationary, annular screen, and a second, rotatable, annular screen. The first annular screen includes a first cylindrical mounting portion and a first flange portion; and the second annular screen includes a second cylindrical mounting portion and a second flange portion. The sealing device is characterized in that both the first and the second annular screens include the same number of non-contacting sealing lips, which are similar to each other and contained axially between the first and second flange portions, in radially alternating positions axially arranged one above the other, so as to define a sealing labyrinth (L). The first and second annular screens define between them a discharge chamber (C1) and an obstruction chamber (C2) which are arranged along the sealing labyrinth (L), substantially at opposite ends of the said sealing labyrinth (L).

8 Claims, 1 Drawing Sheet

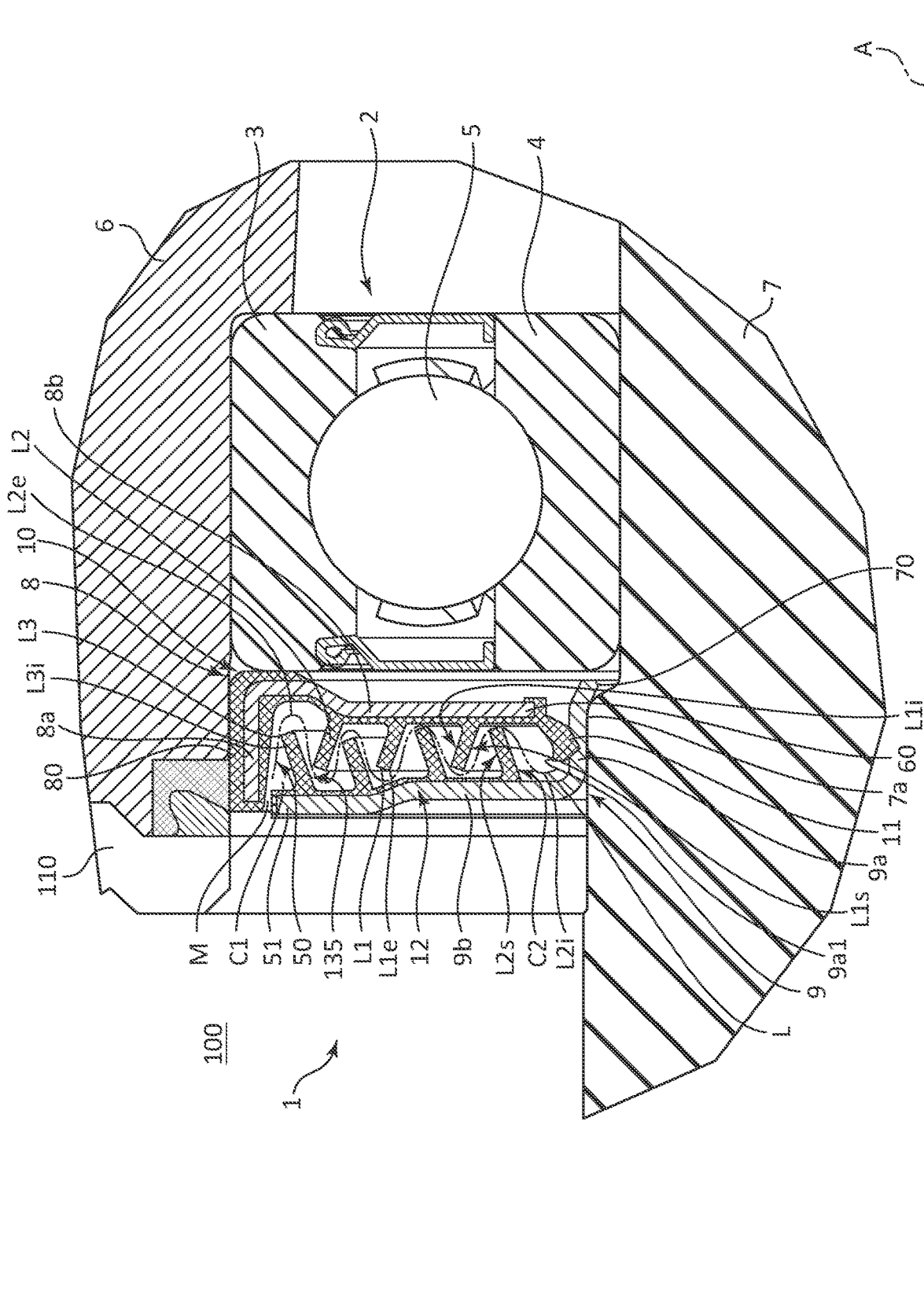

SEALING DEVICE FOR WASHING MACHINE SLEEVES

CROSS REFERENCE TO RELATED APPLICATIONS

This application is based on and claims priority to Italian Patent Application No. 102021000029621 filed on Nov. 24, 2021, under 35 U.S.C. § 119, the disclosure of which is incorporated by reference herein.

FIELD

The present disclosure relates to a sealing device for washing machine sleeves.

BRIEF DESCRIPTION OF THE DRAWINGS

The disclosure will now be described with reference to the attached FIGURE:

FIG. 1 shows a cross-sectional, radial elevation view of a sealing device according to exemplary embodiments of this disclosure.

DETAILED DESCRIPTION

Known washing machines include a washing tub, which may be made of plastic, a drum housed inside the tub and angularly connected to a drive shaft that is rotatably supported by the tub by a sleeve. The sleeve may include a tubular hub made of a metallic material and co-molded in the plastic material of the washing tub and a pair of rolling bearings housed inside the tubular hub. The pair of rolling bearings may be axially spaced from each other in order to be engaged by the drive shaft that projects outside the sleeve itself on a side of the washing tub in order to support the drum. On a side opposite the washing tub, there may be a joint for connection to a washing machine motor.

Known sealing devices for washing machine sleeves may be mounted in a position axially in front of the corresponding sleeves on the same side as the washing tub, namely the side where the drive shaft axially projects from the sleeve to engage the inside of the drum. These sleeves are completely exposed to washing water, detergents, and solid contaminants (e.g., sand, fibers, and gravel) present in the washing tub. These sleeves serve to protect the rolling bearings inside the tubular hub from these contaminants.

Known sealing devices may have a first, shaped, metallic screen engaged onto the drive shaft and a second metallic support screen integrally mounted on the washing tub and provided with sealing lips in sliding contact with the first screen. Usually, in order to provide a good sealing action, at least two sealing lips diverge axially from each other, thereby increasing the dimensions and the axial volumes of the sealing device. At least one of these sealing lips may also be provided with an annular spring for increasing the radial pressure of the sealing lip on the first screen, with a resulting increase in sliding friction, decreasing an operating efficiency of the entire washing machine.

Therefore, known sealing devices having optimum sealing capacities may also have relatively large axial dimensions, limiting the useful space for the washing tub. In cases in which the washing machine require reduced axial volumes, relatively high frictional forces can be produced to the detriment of energy consumption of the washing machines.

It is therefore an object of the present disclosure to provide a sealing device for a washing machines sleeve that achieves a high sealing capacity and low friction levels, while having dimensions optimized for a washing tub in a washing machine with reduced axial dimensions. A further object of the present disclosure is to reduce energy consumption levels and ensure an easy assembly, even by manufacturers who produce the washing machines.

According to an exemplary embodiment, FIG. 1 illustrates a washing machine 100. Washing machine 100 may include a washing tub 110, a drum (not shown for simplicity of illustration) rotatably arranged inside washing tub 110, and a drive shaft 7 for rotation of the drum inside washing tub 110. A sleeve 6 may be integrally joined together with washing tub 110. In various embodiments, sleeve 6 may be co-molded with washing tub 110.

Drive shaft 7 may include a mounting shoulder 7a that projects outside of sleeve 6 for supporting the drum, and is in turn rotatably supported inside sleeve 6 by a pair of bearing units 2 (only one of which is shown for simplicity of illustration). Each bearing unit 2 may include a radially outer ring 3, a radially inner ring 4, and a row of rolling bodies 5 arranged between radially outer ring 3 and radially inner ring 4.

In the whole of the present description and in the claims, terms and expressions which indicate positions and directions, such as "radial", "axial" or "transverse", are to be understood as being in relation to a central axis of symmetry A, which coincides with an axis of rotation of the drum.

A sealing device 1 may be arranged axially alongside bearing unit 2 on a same side as washing tub 110. Sealing device 1 may include an axially extending stationary screen 8 fixed to screen 6 during use and having a cylindrical mounting portion 8a and a flange portion 8b, and an axially extending rotating screen 9 fixed to drive shaft 7 during use and having a cylindrical mounting portion 9a and a flange portion 9b. The axially extending rotating screen 9 faces first screen 8 in the radial direction. In various embodiments, stationary screen 8 and rotating screen 9 are made of sheet metal.

Sealing device 1 may further include an elastomeric element 10 integrally mounted on stationary screen 8 and an elastomeric element 12 integrally mounted on screen 9. Elastomeric element 10 may be provided with one or more axially extending annular sealing lips L1, and elastomeric element 12 may be provided with one or more axially extending annular sealing lips L2. Annular sealing lips L1 and L2 may be non-contacting sealing lips that are similar to each other in composition and design, and are axially contained between flange portions 8b and 9b. Lips L1 and L2 may alternate radially with one another to define a sealing labyrinth L. In various embodiments, annular sealing lips L1 and L2 may be equal in number N.

In various embodiments, lips L1 and L2 may have respective opposite conicities, where a conicity of lips L1 increases towards tub 110, while the conicity of lips L2 decreases towards tub 110. In other words, lips L1 that are further from axis A of bearing unit 10 have progressively greater conicities than lips L1 that are closer to axis A, and lips L2 that are further from axis A have progressively smaller conicities than lips L2 that are closer to axis A.

Sealing lips L1 extend from flange portion 8a of screen 8 towards flange portion 9a of screen 9 and towards lips L2. Lip L2 extend from flange portion 9a of screen 9 towards flange portion 8a of screen 8 and towards lips L1. Lips L1 and L2 may have a similar projecting length so as to be able to be inserted substantially inside one another (i.e. alternating in the radial direction), almost intersecting, but without coming into contact with one another, and thus forming a sealing labyrinth L with a winding form.

Each lip L1 and L2 is radially defined by a respective conical surface L1$s$ and L2$s$, respectively, facing away from axis A, and a respective conical surface L1$i$, or L2$i$ facing axis A. In various embodiments, L1$s$ and L1$i$ are substantially parallel and L2$s$ and L2$i$ are substantially parallel. Therefore, each lip L1 and L2 may have a substantially constant thickness and terminates at a free end L1$e$ and L2$e$, respectively, which, as a result of limited axial dimensions of sealing device 1, may be arranged a distance from surface L2$i$ or L1$i$, respectively, of each respective opposite lip L2 or L1. In various embodiments, a distance between opposing free ends L1$e$ and L2$i$, and free ends L2$e$ and L1$i$, is a very small distance on the order to tenths of a millimeter.

In various embodiments, sealing labyrinth L, as well as the sealing device 1, extends along radial length such that an overall axial volume of sealing device 1 may be limited and extremely compact without, however, losing capacity of its sealing action.

In various embodiments, sealing device 1 may further include a chamber C1 and a chamber C2 defined by flange portions 8$b$ and 9$b$ and arranged along a labyrinth L. Chamber C1 and Chamber C2 may be located at opposite radial ends of sealing labyrinth L.

Chamber C1 is a storage chamber, sometimes referred to as a discharge chamber, arranged at an outer radial end of labyrinth L. Chamber C2 may be an obstruction chamber arranged at an intermediate radial portion of labyrinth L. Alternatively, chamber C2 may be arranged at an inner radial end of labyrinth L.

In various embodiments, chamber C1 may have a greater axial length than chamber C2 due to the fact that a centrifugal speed of annular screen 9 gradually increases in the radial direction away from axis A. The axial lengths of chamber C1 and chamber C2 may be proportional to the centrifugal speed of screen 9 at each respective chamber. This difference in the axial length that is proportional to the centrifugal speed of annular screen 9 is advantageous during operating conditions of sealing device 1. In particular, during use, high tangential speeds caused by rotation of screen 9 creates a centrifugal swirling flow inside of a greater axial length of chamber C1 that helps prevent entry of contaminants inside labyrinth L. At the same time, the reduced tangential speeds caused by rotation of screen 9 at C2, due to its vicinity to axis A, and the reduced axial length of chamber C2 creates a centrifugal swirling flows with more moderate tangential speeds. This has the effect of slowing down and substantially compacting any contaminants along the labyrinth L, preventing them from advancing further inside labyrinth L. Contaminants are further prevented from traveling along the labyrinth L and into bearing unit 10 by lips L1 and L2 extending in the radial direction away from axis A. This results in a plurality of "ramps," which any contaminants must travel up during their movement along the labyrinth L towards axis A, making it even more difficult for contaminants to reach bearing unit 10.

Chamber C1 allows a substantial expansion of any contaminants present inside sealing device 1, favoring an outflow thereof from chamber C2 and facilitating subsequent expulsion thereof to an external environment. Also the orientation of lips L1 and L2 as described herein will favor the outflow of contaminants from chamber C2 towards chamber C1, and in particular along portion of the sealing device 1 arranged at "6 o'clock" zone, namely arranged underneath axis A of a full 360° bearing unit. In this zone, surfaces L1$s$ and L2$s$ of the lips L1 and L2, respectively, act as basic slides for any contaminants during their movement along labyrinth L.

In order to further improve the sealing characteristics of sealing device 1 and its capacity for expelling contaminants, while maintaining the reduced axial dimensions of sealing device 1, screen 8 may include a discharge outlet or discharge surface 50, which may be arranged in a vicinity of cylindrical mounting portion 8$a$ inside sealing device 1. Discharge surface 50 may radially delimit chamber C1 and define, together with a free annular edge 51 of screen 9 an annular passage "M," which has an extremely small axial dimension to prevent entry of contaminants, such as sand and the like while also allowing for discharging of any contaminants that have entered labyrinth L.

Discharge surface 50 may form an integral part of elastomeric element 10 and line cylindrical mounting portion 8$a$ inside sealing device 1. Discharge surface 50 may further lie on a conical surface that tapers towards sleeve 6 and is open towards tub 110. Because discharge outlet 50 is a stationary surface, it facilitates the sliding of contaminants towards passage M.

In various embodiments, elastomeric element 12 that is integral with screen 9 may further include a sealing lip L3 arranged inside discharge chamber C1 and upstream of sealing lips L2 along sealing labyrinth L. Sealing lip L3 may extend towards discharge surface 50 and may be inclined at an inclination opposite an inclination of discharge surface 50, defining a "collector." This collector may accumulate contaminants that may penetrate inside sealing device 1 through passage M, including by means of adhesion to surfaces of the components of sealing device 1, and seep into chamber C1 inside which they will tend to accumulate. The lip L3 may therefore accumulate and/or collect contaminants, preventing the further advancing movement thereof along the labyrinth L. By increasing the number of barriers at the entrance into sealing device 1, sealing device 1 may more effectively prevent introduction of contaminants into sealing device 1 and also make labyrinth L more winding.

Sealing lip L3 extends from portion 9$b$ in a vicinity of end 51 and has a projecting length greater than a projecting length of sealing lips L1 and L2. Sealing lip L3 may extend as far as possible towards discharge outlet 50 such that a free end L3$e$ is in a vicinity of end 51 and such that sealing lip L3 passes along a majority of chamber C1. Sealing lip L3 may extend such that a distance between free end L3$e$ and discharge surface 50 is on the order of tenths of millimeters. This avoids potential sliding contact and subsequent friction while at the same time improving the sealing capacity of sealing device 1.

Lip L3 may be radially defined by two conical surfaces L3$s$ and L3$i$, where surface L3$s$ faces axis A and surface L3$s$ faces away from axis A. Surface L3$s$ thus acts as a slide for any contaminants moving along labyrinth L towards passage M.

The effects of lip L3, of lips L1 and L2, of the winding form of labyrinth L, of discharge outlet 50, and of the interrelationship resulting from the positions of these components may be considered in combination with each other and also in their successive mutually superimposed arrangement, for purposes of both achieving an effective sealing action and an effective discharge capacity of sealing device 1.

In various embodiments, each free end L2$e$ of each lip L2 may be arranged as close as possible to each respective surfaces L1$i$ of lips L1 defining a very small free space between them on the order of tenths of a millimeter. Similarly, each free ends L1e of each lip L1 may be arranged as close as possible to each respective surface L2s of each lip L2 and to surface L3s of lip L3 defining a very small free space on the order of tenths of a millimeter.

Because lips L1 and L2 may be arranged inside chamber C2, namely inside a radially intermediate part communicating with the chamber C1, the spaces between L1 and L2 may be even smaller than the space between lip L3 and discharge outlet 50.

For purposes of increasing the barriers preventing any contamination of the bearing 2, the screen 8 or the elastomeric element 10 integral therewith may be provided with a sliding annular sealing lip 11. The annular sealing lip 11 is arranged inside the chamber C2 and in sliding contact with the cylindrical portion 9a of the screen 9. The sliding sealing lip 11 extends from an inner radial end 60 of the flange portion 8b of the screen 8 and has a thickness with dimensions greater than the dimensions of a thickness of the lips L1 and L2 since it must exert a radial pressure on the cylindrical portion 9a with a controlled value precisely because of its form.

Finally, as described above, it is clear that, because lips L1 and L2 are arranged in positions so close to each other, almost intersecting each other, and lip L3 is also arranged in a position very close to discharge outlet 50, namely elastomeric element 10 and elastomeric element 12 are arranged very close to each other because of the small axial dimensions of sealing device 1, the absolutely precise mounting of screens 8 and 9 is required. Therefore, annular screen 9 may include a shaped stop edge 70 formed at a free end of cylindrical mounting portion 9a so as to define a precise position of sealing device 1 along drive shaft 7 and with respect to the sleeve 6. Elastomeric element 10 further include a cylindrical mounting portion 80 connected to cylindrical portion 8a and may be internally keyed with interference inside sleeve 6, axially against bearing 2 of sleeve 6 so as to define a precise position of annular screen 8 with respect to annular screen 9. This ensures the correct positioning of lips L1 and L2 with respect to each other.

In particular, assembly of sealing device 1 may be performed by keying with interference of screen 8, or rather cylindrical mounting portion 80 inside sleeve 6, and arranging screen 8 with its flange portion 8b in axial abutment against bearing 2. Whereas screen 9 is slid axially along drive shaft 7 until shaped stop edge 70 engages against shoulder 7a of drive shaft 7, which determines the mounting by means of interference of cylindrical mounting portion 9a onto drive shaft 7. Once screen 9 is positioned, drive shaft 7 is inserted inside bearing 2, causing the gradual axial movement of screens 8 and 9 towards a mounting position where lips L1 and L2 are arranged spaced from each other in accordance with the description provided herein.

It is worth mentioning that annular screen 9 may be designed so that cylindrical portion 9a, which is intended to perform an anchoring action, is directed towards radially inner ring 4 of bearing 2 and that shaped stop edge 70, which has a substantially frustoconical shape, opens outwards towards axis A so that annular sliding sealing lip 11 may slide over it and, likewise, may also slide on a radially outer surface 9a1 of cylindrical portion 9a without any possibility of bending back onto itself.

In various embodiment of sealing device 1 shown in FIG. 1, elastomeric element 10 and elastomeric element 12 are provided with three lips L1, L2, each for obtaining the required sealing efficiency. Advantageously, the three lips L1 and the three lips L2, as well as the lip L3, are non-contacting annular sealing lips, the axial dimensions of which are optimized so as to make the labyrinth L as long and as winding as possible and as axially narrow as possible. At the same time, annular sealing lips L1, L2 are sized such that they do not contact each other, which could result in leakages due to friction.

With sealing device 1 disclosed herein, a series of advantages may be obtained and the objects predefined by the present disclosure may be achieved.

Firstly, the leakages due to friction are reduced and therefore significant savings in energy are achieved. Compared to the known solutions, which use two and in some cases three contacting lips, the number of contacting lips for sealing device 1 disclosed herein is reduced to one contacting lip. The sealing performance is essentially ensured by the winding labyrinth and therefore is not related to the contact force of the sliding lip, thereby helping reduce the leakages due to friction.

Secondly, by taking advantage of a substantially intersecting arrangement of lips L1 and L2 and the "gutter" effect of lip L3, sealing device 1 is able to achieve a significant reduction in the axial volume, of about less than half compared to other known solutions. This results in maximization of the axial space available for washing tub 110, and therefore an increase in the loading capacity of the drum of washing machine 100.

Thirdly, the optimized form of the labyrinth L, which is very long and very narrow due to the number and dimensions of sealing lips L1 and L2, is able to fully exploit the sealing action offered by sealing device 1, and guarantee an excellent sealing performance.

Finally, mounting of the sealing device is simplified because it is very precise, as the bearing unit and the shoulder of the drive shaft serve as locating points, and because it does not require further machining of other components.

In addition to the exemplary embodiments of the disclosure described herein, it will be understood by a person of ordinary skill in the art that there exist numerous other variants. It will also be understood that these embodiments are only examples and do not limit either the scope of the disclosure, its applications, or its possible configurations. On the contrary, although the description above allows a person skilled in the art to implement the present disclosure at least according to one exemplary embodiment, it will be understood that many variants of the components described are possible, without thereby departing from the scope of the disclosure, as defined in the accompanying claims, interpreted literally and/or in accordance with their legal equivalents.

We claim:

1. A sealing device for a sleeve of a washing machine, the sealing device comprising:
    a stationary first annular screen comprising:
        an axially extending first cylindrical mounting portion;
        a radially extending first flange portion connected to the first cylindrical mounting portion; and
        a plurality of non-contacting sealing lips extending from the first flange portion;
    a rotatable second annular screen axially facing the first annular screen, the second annular screen comprising:
        an axially extending second cylindrical mounting portion comprising:
            a shaped stop edge formed at an axially inner end of the second cylindrical mounting portion, the shaped stop edge bent in a radially inward direction relative to the second cylindrical mounting portion; and a radially extending second flange portion connected to the second cylindrical mounting portion; and a plurality of non-contacting sealing lips extending towards the first flange portion and alternating radially with the plurality of non-contacting sealing lips of the first annular screen;

wherein, the first annular screen and the second annular screen define together:

a discharge chamber at the first cylindrical mounting portion;

an obstruction chamber at the second cylindrical mounting portion, the plurality of non-contacting sealing lips of the first annular screen and the plurality of non-contacting sealing lips of the second annular screen define together:

a labyrinth seal extending radially from the discharge chamber to the obstruction chamber, and the plurality of non-contacting sealing lips of the first annular screen and the plurality of non-contacting lips of the second annular screen are equal in number.

2. The sealing device of claim 1, wherein, the first annular screen defines a discharge outlet arranged in the region of the second cylindrical mounting portion, the second annular screen is configured to delimit radially the discharge chamber and define an annular passage with the first annular screen, the annular passage configured to discharge from the sealing device contaminants entered into the labyrinth seal, and the plurality of non-contacting sealing lips of the second annular screen comprises a radially outermost sealing lip arranged inside the discharge chamber, the radially outermost sealing lip directed towards the discharge outlet with an axial inclination opposite to an axial inclination of the discharge outlet.

3. The sealing device of claim 2, wherein the radially outermost sealing lip of the second annular screen extends from the second flange portion and comprises a projecting length greater than a projecting length of each non-contacting sealing lip of the plurality of non-contacting sealing lips of the first annular screen and greater than a projecting length of each remaining non-contacting sealing lip of the plurality of non-contacting sealing lips of the second annular screen.

4. The sealing device of claim 2, wherein the first annular screen further comprises a sliding sealing lip arranged inside the obstruction chamber and is in sliding contact with the second cylindrical mounting portion, and wherein the sliding sealing lip comprises a thickness greater than a thickness of each non-contacting sealing lip of the plurality of non-contacting sealing lips of the first annular screen and greater than a thickness of each non-contacting sealing lip of the plurality of non-contacting sealing lips of the second annular screen.

5. The sealing device of claim 1, wherein each of the discharge chamber and the obstruction chamber comprise axial dimensions which are different and proportional to the centrifugal speeds of the second annular screen.

6. The sealing device of claim 1, further comprising:

a first elastomeric element mounted to the first annular screen and forming the plurality of non-contacting sealing lips of the first annular screen; and a second elastomeric element mounted to the second annular screen and forming the plurality of non-contacting sealing lips of the second annular screen, wherein each of the plurality of non-contacting sealing lips of the first annular screen and the plurality of non-contacting sealing lips of the second annular screen comprise three non-contacting sealing lips.

7. The sealing device of claim 6, wherein the first elastomeric element comprises a cylindrical mounting portion connected to the first cylindrical portion and internally keyed with interference inside the sleeve axially against a bearing unit of the sleeve, the first elastomeric element is configured to define a precise position of the first annular screen with respect to the second annular screen.

8. The sealing device of claim 1, wherein, the first annular screen is made of sheet metal, and the second annular screen is made of sheet metal.

\* \* \* \* \*